No. 884,762. PATENTED APR. 14, 1908.
E. RISTING & F. KABATCHNICK.
CUTTING AND MARKING MACHINE.
APPLICATION FILED MAY 7, 1906.

3 SHEETS—SHEET 1.

Witnesses:
Harry R. L. White
Ray White

Inventors
Erling Risting
Frank Kabatchnick
By Charles Lee Mill Atty.

No. 884,762. PATENTED APR. 14, 1908.
E. RISTING & F. KABATCHNICK.
CUTTING AND MARKING MACHINE.
APPLICATION FILED MAY 7, 1906.
3 SHEETS—SHEET 2.
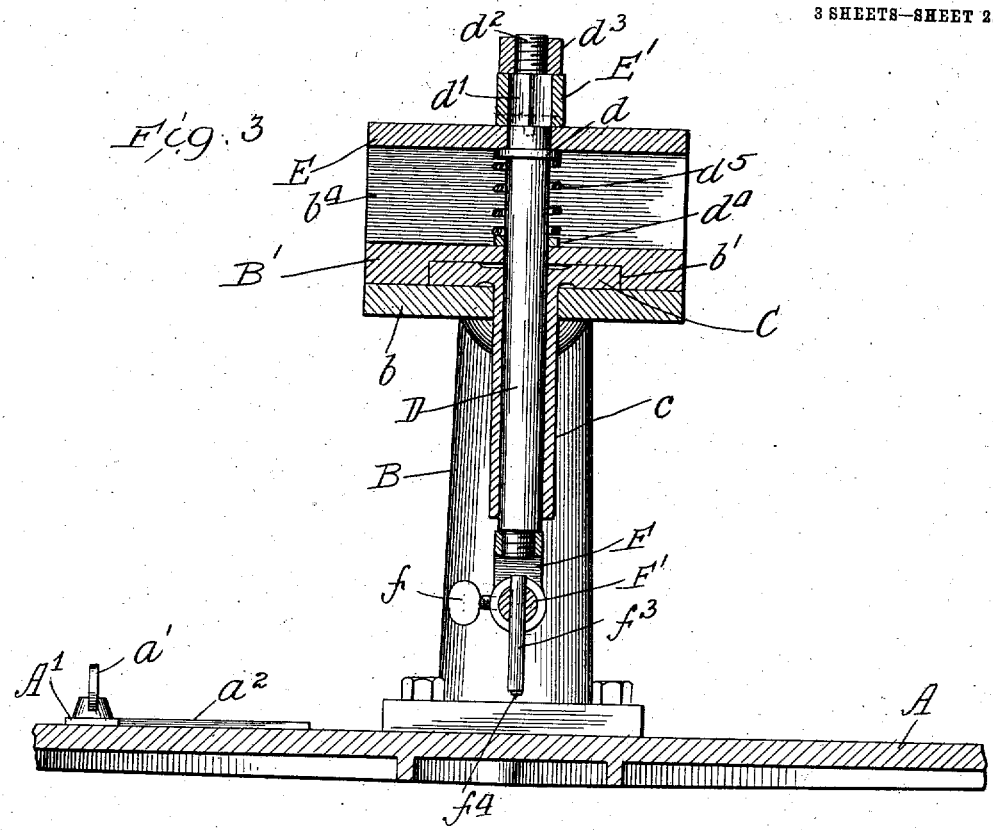
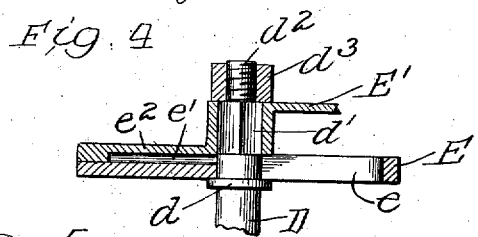
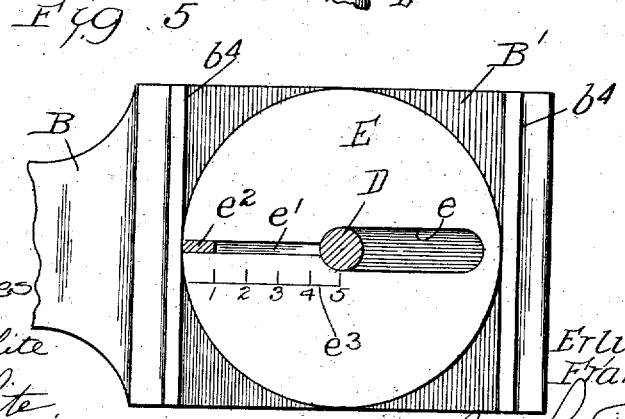

No. 884,762. PATENTED APR. 14, 1908.
E. RISTING & F. KABATCHNICK.
CUTTING AND MARKING MACHINE.
APPLICATION FILED MAY 7, 1906.

3 SHEETS—SHEET 3.

Witnesses:
Harry P. L. White
Ray White

Inventors.
Erling Risting
Frank Kabatchnick
By Charles W. Hills, Atty.

UNITED STATES PATENT OFFICE.

ERLING RISTING AND FRANK KABATCHNICK, OF CHICAGO, ILLINOIS; SAID KABATCHNICK ASSIGNOR TO SAID RISTING.

CUTTING AND MARKING MACHINE.

No. 884,762.  Specification of Letters Patent.  Patented April 14, 1908.

Application filed May 7, 1906. Serial No. 315,685.

*To all whom it may concern:*

Be it known that we, ERLING RISTING and FRANK KABATCHNICK, citizens of the United States, and residents of the city of Chicago, in the county of Cook and State of Illinois, have invented certain new and useful Improvements in Cutting and Marking Machines; and we do hereby declare that the following is a full, clear, and exact description of the same, reference being had to the accompanying drawings, and to the letters of reference marked thereon, which form a part of this specification.

This invention relates to improvements in cutting and marking machines and more particularly to a machine adapted to cut or describe circular figures of various kinds as well as straight lines.

Heretofore various cutting and marking machines have been constructed but in many of them the multiplicity of the adjusting parts has been such that it has required a considerable time to adjust them to perform the desired operation.

The object of this invention is to provide a cutting and marking machine adapted to describe various circular forms and which may be quickly and easily adjusted.

It is a further object of the invention to provide a very simple, though strong device which, while it is capable of being adjusted to describe a great variety of figures, yet it has but few adjustable parts thereby decreasing its liability of getting out of repair.

The invention consists in the matters hereinafter described and more fully pointed out and defined in the appended claims.

Figure 1:
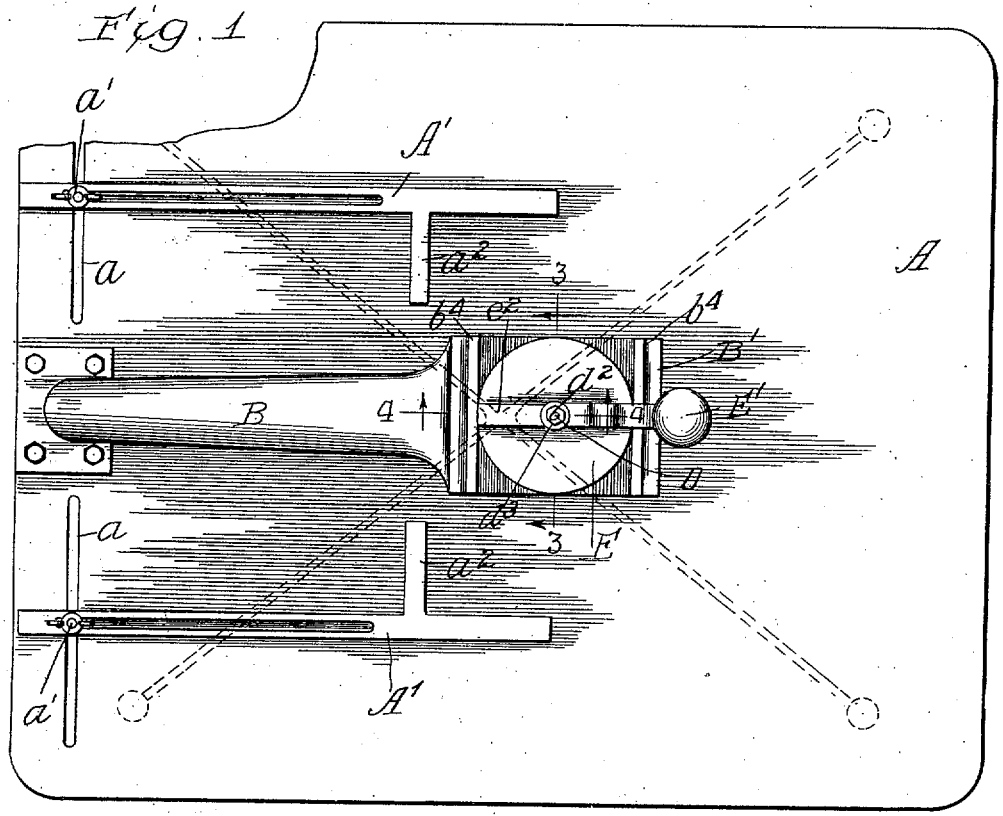
Figure 2:
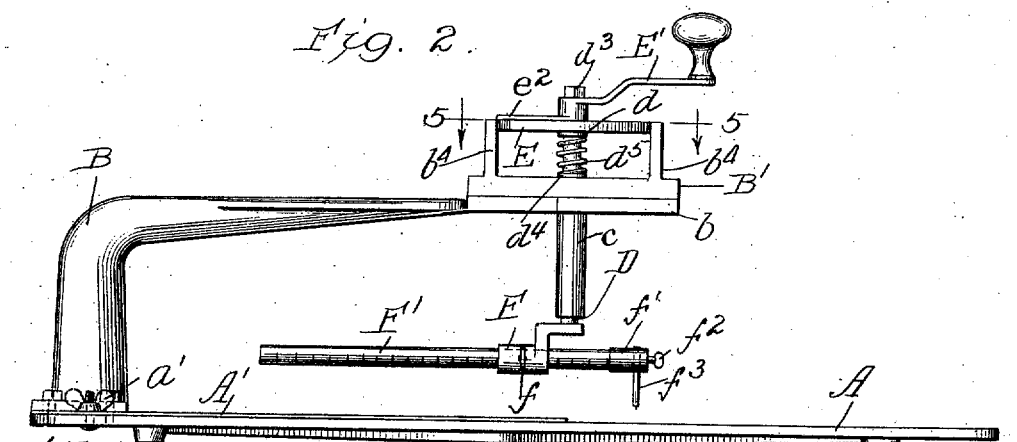
Figure 6:
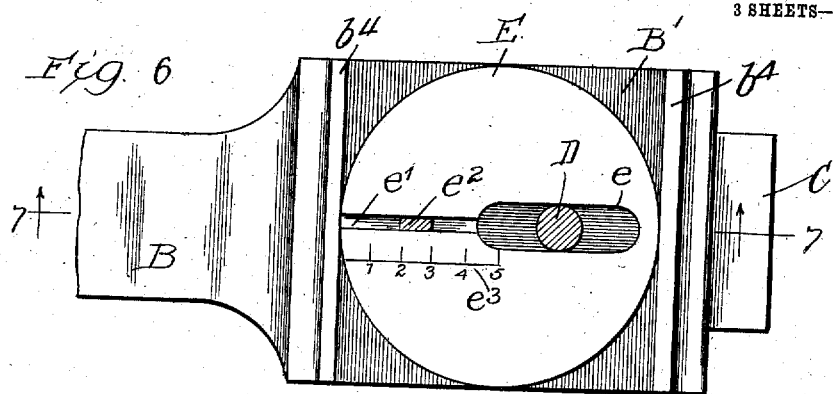
Figure 7:
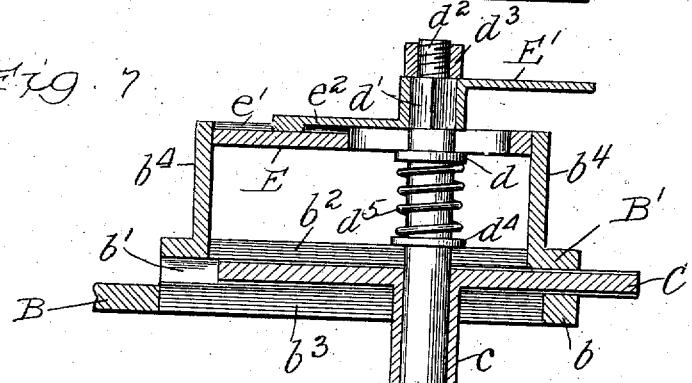
Figure 8:
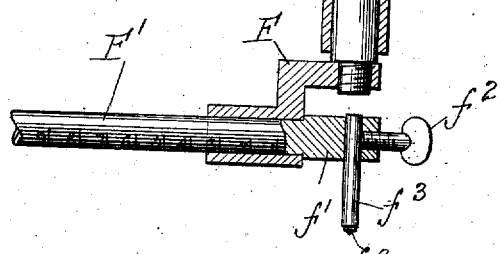
Figure 9:
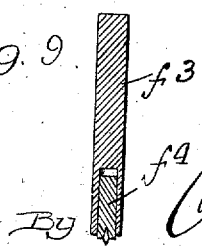

In the drawings: Figure 1 is a fragmentary top plan view of a device embodying my invention. Fig. 2 is a side elevation thereof showing the device adjusted to describe a true circle. Fig. 3 is a section taken on line 3—3 of Fig. 1. Fig. 4 is a fragmentary section taken on line 4—4 of Fig. 1. Fig. 5 is an enlarged, fragmentary horizontal section taken on line 5—5 of Fig. 2. Fig. 6 is a view similar to Fig. 5 but showing the parts adjusted to describe a straight line. Fig. 7 is a section taken on line 7—7 of Fig. 6. Fig. 8 is a side elevation of the adjustable tool carrier, and, Fig. 9 is an enlarged longitudinal section of the cutter.

As shown in said drawings: A represents a work table or bed piece of any desired size and construction but which may conveniently be a casting and which as shown is provided near its rear end with transverse slots $a$—$a$ in which are adjustably engaged on each side of the center of the table, the clamping bars A' which may be of any desired material to afford sufficient rigidity and which as shown are provided with longitudinal slots adapted to receive the set screws $a'$ which extend through the slots in the table and act to secure said bars in place. Each of said clamping bars or members as shown, is provided with an inwardly directed transverse arm $a^2$ adapted to bear upon the material and hold it in unvarying position during the operation.

Rigidly engaged on the rear end of said table A and extending upwardly and forwardly over the same centrally thereof is the standard B which, as shown, is provided at its forward end with an approximately rectangular shaped plate $b$ on which is rigidly engaged the guide table. Said guide table B' as shown more clearly in Figs. 3 and 7, is provided on its under side with a longitudinal recess or chamber $b'$ and is provided with a central longitudinal slot $b^2$ opening into said chamber and registering with a central longitudinal slot $b^3$ in said plate $b$. Fitting closely in said chamber $b'$ and slidable longitudinally therein is a slide bar C which as shown more clearly in Figs. 3 and 7 is cored centrally on its top and bottom faces to reduce the bearing surfaces thereof. Said slide block as shown is provided with a central aperture therein and extending downwardly therefrom through the slot $b^3$ and registering with said aperture is an elongated bearing sleeve $c$. Journaled in said bearing sleeve $c$ and extending upwardly through the slot $b^2$ is a shaft D which, as shown, is provided near its upper end with an outwardly directed, peripheral flange $d$ upon which is seated a circular guide plate E of a diameter to closely engage between the parallel, transverse guide flanges $b^4$, formed integrally with and extending upwardly from the guide table B'. The guide plate E is provided with a slot $e$ therethrough which as shown extends from near one margin of the plate radially beyond the axis of said plate a sufficient distance so that when the shaft D is at the inner end of said slot, its axis co-incides with the axis of said plate. The end $d'$ of said shaft D, above the guide plate E, is formed angular as shown to receive the crank E' and above said angular portion is a threaded portion $d^2$ adapted to receive the nut $d^3$ by means of which said crank is forced into binding engagement upon said guide plate and together with the flange $d$ rigidly holds said plate in its adjusted position. Said guide plate E, as shown, is provided with a groove $e'$ in radial alinement with the slot $e$ and the crank E' is provided with a longitudinally directed arm $e^2$ which is provided with a downturned end adapted to slidingly engage in said groove thereby causing said plate to rotate with the shaft D. As shown a linear scale $e^3$ is provided adjacent said groove $e'$ and in respect to which the outer end of said arm is adjusted in setting the guide plate.

Slidingly engaged on the shaft D adjacent the top of the guide table B' is a collar or washer $d^4$, between which and the flange $d$ engages a coiled spring $d^5$, which acts normally to force the shaft D upwardly from the table A. Adjustably engaged on the lower end of the shaft D in any desired manner is a downwardly and laterally directed bracket F, which is provided with a horizontal aperture therethrough, in which is adjustably engaged, by means of a set screw $f$, the carrying bar F' which may be of any desired material and which, as shown, is provided with a linear scale reading from the head $f'$ rearwardly. Said end $f'$ is provided with a vertical aperture therethrough which when said bar is at the inner limit of its movement, is in axial alinement with the shaft D and adjustably engaged therein by means of a set screw $f^2$ is a downwardly directed bar $f$ provided with a socket at its lower end in which is removably engaged the cutting or marking instrument $f^4$.

The operation is as follows: The article to be cut or marked is engaged upon the table A beneath the clamping members A' and if it is desired to describe a straight line on the article, the shaft D is adjusted outwardly from the center of the guide plate thereby moving the arm $e^2$ along the scale $e^3$ to a point from the lower end of the scale equal to one half the length of the line to be described. Inasmuch as the guide plate E is held by the guide flange $b^4$ from movement longitudinally of the guide table it is obvious that rotation thereof by means of the crank E', causes said shaft D to move longitudinally of the slots $b^2$—$b^3$ and thereby move the knife or marker $f^4$ in a straight line. When the plate is rotated, downward pressure is exerted on the crank thereby forcing the knife or marker into engagement with the work and owing to the elongated bearing of the shaft on the slide plate C it is always held in vertical position.

When it is desired to describe a true circle the shaft D is adjusted to bring its axis to co-incide with the axis of the plate thereby giving it rotary motion only. The carrier bar F is then adjusted to bring the bar $f^3$ a distance from the axis of the shaft equal to the radius of the circle to be described.

When it is desired to cut or describe irregular circles, ovals or elliptical figures the shaft D is adjusted along the slot $e$ to give the desired length of the major axis of the circular figure and the carrying bar F' is adjusted to bring the point $f^4$ a distance from the axis of the shaft D to provide the minor axis of the figure desired to be described.

Obviously a device constructed in accordance with my invention is capable of describing a great variety of figures and the adjustments are capable of being quickly and accurately made.

We claim as our invention:

1. The combination with a table of a guide table supported on the same having a recess on its under side and upturned integral flanges, a vertically movable guide plate revoluble between said flanges, a slide bar movable in said recess in the guide table, a shaft extending through the same and guide table and plate and a removable bracket carried on the end of said shaft provided with an aperture therethrough.

2. The combination with a support of a table carried thereon having integral upturned flanges and provided with a recess or chamber, a slide bar movable in said recess in the table, a guide plate carried on said table, a rotatable shaft extending through said table, plate, slide and support, a crank secured to the top of said shaft, an arm rigidly engaged thereto adapted to rotate said guide plate when the shaft rotates and a removable bracket on the end of said shaft provided with an aperture therethrough to adjustably engage a tool.

3. The combination with a table of a guide plate supported above the same, a depressible shaft rotatively engaged in the guide plate, an arm carried by said shaft adapted to simultaneously depress the guide plate as the shaft is depressed and to rotate the same, collars engaged on said shaft and one movable longitudinally thereof, means bearing on said collars normally holding the shaft at its upper limit of movement, and an adjustable and removable tool carrier on the lower end of said shaft.

4. In a device of the class described the combination with a work table, of a slotted guide table supported above the same provided with a recess, a slotted circular guide plate carried thereon and provided with a groove, a slide bar movable in the recess in the guide table, an elongated bearing sleeve integral therewith, a shaft extending through the guide table, guide plate and sleeve, an arm carried thereon and engaging the groove in said guide plate to rotate the same when the shaft is actuated, a bracket engaged to the lower end of the shaft and an adjustable bar carried on said bracket.

5. In a device of the class described the combination with a work table of a slotted guide table supported above the same and provided with parallel flanges, said guide table having a recess therein adjacent the slot, a slide bar movable in the recess in said table, a downwardly directed bearing sleeve engaged thereto, a vertically and horizontally movable shaft extending through the slot in said table and the sleeve, a guide plate adapted when the shaft is rotated to move said shaft from one flange toward the other and a spring automatically retracting the tool after each cut.

6. In a device of the class described the combination with a work table of a slotted guide table supported thereon, upwardly directed parallel flanges on said guide table extending transversely of the slot, a vertical shaft in said slot, a circular slotted plate rigidly but adjustably engaged on said shaft and engaging between said flanges, a crank engaged on said shaft and plate, an adjustable tool carrier on the lower end of said shaft and an elongated bearing for said shaft slidably engaged in the guide table.

7. In a device of the class described the combination with a work table of a slotted guide table carried thereon, a slide bar in said guide table, a bearing sleeve thereon projecting downwardly from the slot in said table, a shaft rotatively engaged in said sleeve, an adjustable tool carrier thereon and means for simultaneously rotating said shaft and moving it longitudinally of said slot.

8. In a device of the class described the combination with a work table of clamping means thereon, a standard on said table, a slotted guide table thereon, upwardly directed parallel flanges thereon extending transversely of said slot, a slide bar slidably engaged in said guide plate, a downwardly directed bearing sleeve thereon, a shaft rotatively engaged in said sleeve, a radially adjustable plate on said shaft engaging between said flanges, means for rotating said shaft and an adjustable tool carrier on the lower end of said shaft.

9. In a device of the class described the combination with a guide table having a groove in the under side thereof, upturned flanges integral with the guide table, a slide bar in said groove, a bearing sleeve depending therefrom, a shaft extending through the sleeve, a depressible slotted guide plate on said shaft and movable therewith, an arm secured to the shaft engaging the plate to actuate the same as the shaft is rotated and means holding the guide plate in operative relation with the arm and adapted to automatically return the guide plate and shaft to normal position after each actuation.

10. In a device of the class described the combination with a guide table of a shaft extending therethrough, a bearing sleeve for the shaft, a rotatable and reciprocatable guide plate on said shaft, means secured to the shaft adapted to reciprocate the guide plate as the shaft is depressed, and a spring holding the guide plate and means on the shaft in operative relation and also adapted to force the parts to normal after each depression of the shaft.

11. In a device of the class described the combination with a recessed guide table having flanges of a slide movable in the recess, a sleeve integral therewith, a shaft extending through the sleeve, a guide plate on the shaft rotatably confined within the flanges on the guide table and movable longitudinally thereof and having a groove, a crank rigidly secured to the shaft, an arm integral with the crank and having its end engaged in the groove, and means preventing the guide plate moving out of operative relation with said arm.

In testimony whereof we have hereunto subscribed our names in the presence of two subscribing witnesses.

ERLING RISTING.
  FRANK KABATCHNICK.

Witnesses:
 W. W. WITHENBURY,
 WM. C. SMITH.